US006529360B2

(12) United States Patent
Kracht et al.

(10) Patent No.: US 6,529,360 B2

(45) Date of Patent: Mar. 4, 2003

(54) OVERVOLTAGE PROTECTION ELEMENT SYSTEM

(75) Inventors: Gerd Kracht, Henstedt-Ulzburg (DE); Eberhard Lehmann, Kiel (DE); Klaus Scheibe, Kiel (DE); Joachim Schimanski, Detmold (DE); Martin Wetter, Detmold (DE)

(73) Assignee: Phoenix Contact GmbH & Co., Blomberg (DE)

( * ) Notice: Subject to any disclaimer, the term of this patent is extended or adjusted under 35 U.S.C. 154(b) by 0 days.

(21) Appl. No.: 09/939,629

(22) Filed: Aug. 28, 2001

(65) Prior Publication Data

US 2002/0024789 A1 Feb. 28, 2002

Related U.S. Application Data

(62) Division of application No. 09/299,743, filed on Apr. 27, 1999.

(30) Foreign Application Priority Data

Apr. 27, 1998 (DE) ........................................ 198 18 674

(51) Int. Cl.[7] ................................................ H02C 7/12

(52) U.S. Cl. ....................................... 361/118; 361/130

(58) Field of Search ................................ 361/111, 117, 361/118, 136, 129, 130, 120, 132; 313/326, 325, 238, 244, 293, 294; 174/267, 357, 2

(56) References Cited

U.S. PATENT DOCUMENTS

| | | | | |
|---|---|---|---|---|
| 3,450,923 A | | 6/1969 | Brumm | |
| 3,878,423 A | | 4/1975 | Hill et al. | |
| 4,158,869 A | | 6/1979 | Gilberts | |
| 5,043,838 A | * | 8/1991 | Sakich | 361/117 |
| 5,128,824 A | * | 7/1992 | Yaworski et al. | 361/127 |
| 5,566,056 A | | 10/1996 | Chaudhry | |
| 5,604,400 A | | 2/1997 | Altmaier et al. | |
| 5,604,430 A | | 2/1997 | Decker et al. | |

FOREIGN PATENT DOCUMENTS

| | | |
|---|---|---|
| DE | 919 055 | 10/1954 |
| DE | 27 18 188 | 10/1978 |
| DE | 29 34 236 | 3/1981 |
| DE | 31 01 354 | 8/1982 |
| DE | 37 16 997 | 12/1988 |
| DE | 41 41 681 | 7/1993 |
| DE | 41 41 682 | 7/1993 |
| DE | 42 44 051 | 7/1994 |
| DE | 44 02 615 | 12/1994 |
| DE | 196 19 334 | 11/1997 |
| FR | 2 389 994 | 12/1978 |
| FR | 2 495 827 | 6/1982 |
| GB | 1 100 604 | 1/1968 |
| GB | 1 603 031 | 11/1981 |

OTHER PUBLICATIONS

Flashtrap FLT, 98/99 Catalog of the Company Phoenix Contact GMBH & Co., Blomberg, Germany, Parts Catalog 7, Trabtech Overvoltage Protection, pp. 12–15.

* cited by examiner

*Primary Examiner*—Kim Huynh
(74) *Attorney, Agent, or Firm*—Nixon Peabody LLP; David S. Safran

(57) ABSTRACT

An overvoltage protection element for diverting transient overvoltage, with two electrodes (3, 4), each of which has a current terminal (1, 2), an air-breakdown spark gap (5) between the electrodes (3, 4) and a housing (6) which holds the electrodes (3, 4). The overvoltage protection element with an air-breakdown spark gap (5), with reference to the operating voltage, the lightning surge current and network follow current carrying capacity behavior and the network follow current extinguishing behavior meets current requirements in a special way by the electrodes (3, 4) being located parallel to one another.

8 Claims, 4 Drawing Sheets

OVERVOLTAGE PROTECTION ELEMENT SYSTEM

CROSS-REFERENCE TO RELATED APPLICATION

This application is a Divisional of application Ser. No. 09/299,743 filed Apr. 27, 1999.

BACKGROUND OF THE INVENTION

1. Field of the Invention

The invention relates to an overvoltage protection system for diverting transient overvoltage with two electrodes, each of which has one current terminal, an air-breakdown spark gap which acts between the electrodes, and a housing which holds the electrodes.

2. Description of Related Art

Electrical, but especially electronic measurement, control and switching circuits, mainly also telecommunications means and systems, are sensitive to transient overvoltage, as can occur especially as a result of atmospheric discharges, i.e., by lightning stroke currents, but also due to short circuits and switching operations in power supply networks. This sensitivity has increased to the degree to which electronic components, especially transistors and thirsters, are used; mainly, the integrated circuits which have been increasingly used are greatly endangered by transient overvoltage.

In addition to the overvoltage protection element underlying the invention (see, German Patent No. DE 37 16 997 C2), i.e., one with an air-breakdown spark gap, there are overvoltage protection elements with an air-spark over spark gap in which a creeping discharge occurs upon triggering (compare, published German Patent Applications DE 27 18 188 A1, DE 29 34 236 A and DE 31 01 354 A1).

Overvoltage protection elements of the type underlying the invention, i.e, those with an air-breakdown spark gap, compared to overvoltage protection elements with an air-spark over spark gap, have the advantage of higher surge current carrying capacity, but the disadvantage of a higher and also not especially constant operating voltage.

Various overvoltage protection elements with an air-breakdown spark gap have been developed which have also been improved with respect to the operating voltage (compare DE 41 41 681 A1, DE 41 41 682 A1, DE 42 44 051 A1 and DE 44 02 615 A1, the last mentioned German Patent corresponding to U.S. Pat. No. 5,604,400).

The overvoltage protection element known from U.S. Pat. No. 5,604,400 has already acquired great importance in practice, is produced and sold by the assignee of the present application under the name FLASH TRAP FELT (see, '98/99 catalog of the company Phoenix Contact GmbH & Co, Bloomer, Germany, Parts Catalog 7 "TRABTECH Overvoltage protection" and the explanations given there on the problem of overvoltage, especially on pages 3–5 and 12–17). In this known overvoltage protection element, each electrode has a terminal leg and an arcing horn which runs at an acute angle to the terminal leg, and the arcing horns of the two spaced electrodes together form the air-breakdown spark gap. Here, between the opposite ends of the terminal legs of the two electrodes, there is an ignition aid which triggers a creeping discharge. In addition, it can be obtained from U.S. Pat. No. 5,604,400 that it is advantageous if the arcing horns of the electrodes are provided with a hole in their areas which border the terminal leg.

The above addressed overvoltage protection element, which is known from U.S. Pat. No. 5,604,400, is made in a practical implementation such that, on the one hand, it has a surge current carrying capacity of 100 kA, and on the other hand, it is suitable for extinguishing network follow currents into the range of 100 A.

SUMMARY OF THE INVENTION

The primary object of the present invention is to provide another overvoltage protection element with an air-breakdown spark gap which, with reference to the operating voltage, the lightning surge current and the network follow current carrying capacity behavior and the network follow current extinguishing behavior meets current requirements in a special way.

The overvoltage protection element as in accordance with the present invention is, first of all, essentially characterized in that the electrodes are located parallel to one another. In this case, the electrodes can be made cylindrical and can have a circular, oval and/or a rectangular cross section. It is especially advantageous if the electrodes have different cross sections over their length. Different cross sections means not only a difference in geometry, therefore circular, oval or rectangular, but also in dimensions; therefore, the electrodes can be staggered (stepped) in cross section along their length, so that the area which is to act as the air-breakdown spark gap can be locally set in a special way.

It is especially advantageous for the serviceability of the overvoltage protection element in accordance with the present invention if the interior of the housing which holds the electrodes is lined, the lining being made, preferably, of POM Teflon®.

In the prior art, especially also in the overvoltage protection element which is disclosed by U.S. Pat. No. 5,604,400, in cross section, the air-breakdown spark gaps are generally designed as extinguishing spark gaps. Conversely, another teaching of the invention which acquires special importance is that, in the overvoltage protection element in accordance with the invention, the housing which holds the electrodes is closed and pressure resistant.

In particular, there are different possibilities for embodying and developing the overvoltage protection elements of the invention. Nonetheless, these and further objects, features and advantages of the present invention are described below in connection with the accompanying drawings which, for purposes of illustration only, show only some of the possible embodiments in accordance with the present invention.

DETAILED DESCRIPTION OF THE INVENTION

Figure 1:
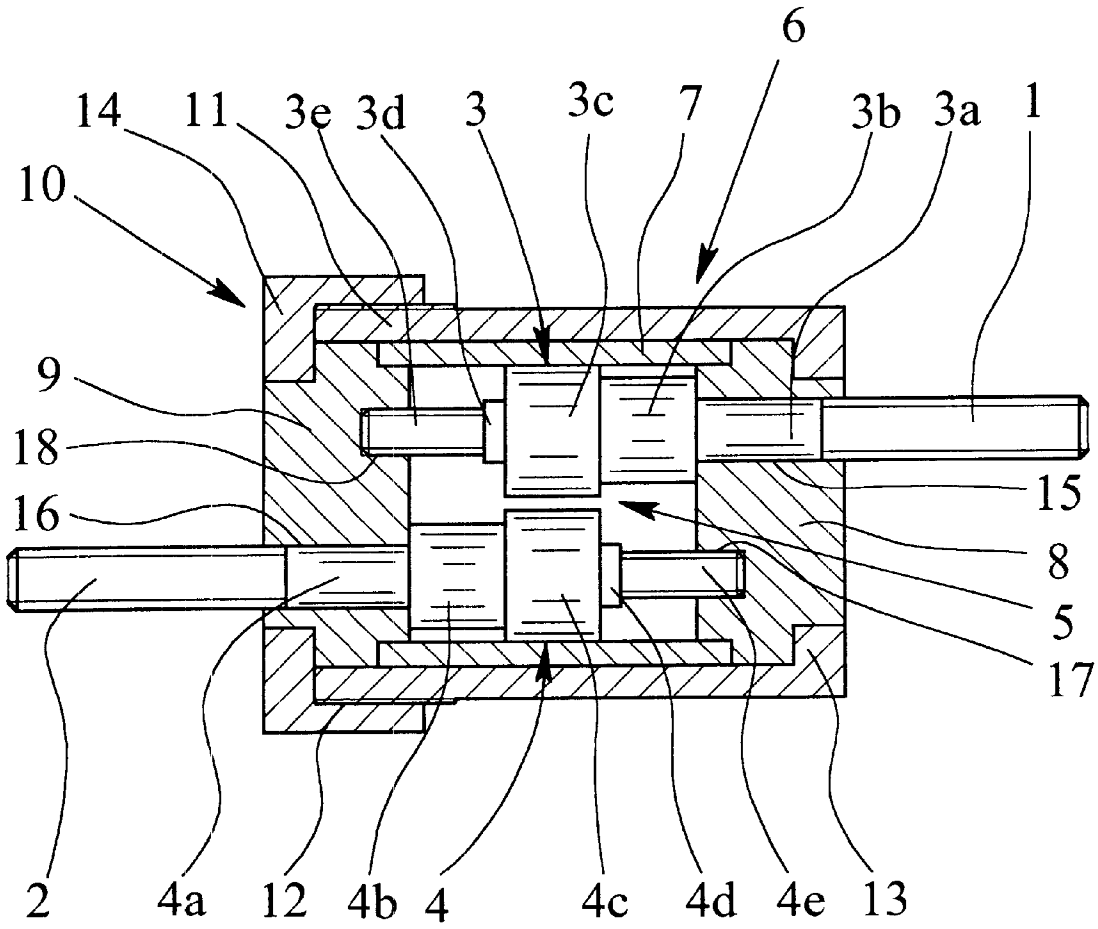
FIG. 1 is a longitudinal section through an especially preferred embodiment of an overvoltage protection element in accordance with the invention.

The overvoltage protection element as claimed in the invention shown in the figures is used to divert transient overvoltage and to limit surge currents, especially lightning surge currents, and to extinguish network follow currents; lightning surge currents up to 100 kA can be diverted and network follow currents of typically 3 to 4 kA, a maximum of 25 kA or even of 50 kA, can be extinguished.

The overvoltage protection element in accordance with the invention comprises, in its essential structure, two electrodes 3, 4, each of which has a current terminal 1, 2, respectively, an air-breakdown spark gap 5 which acts between the electrodes 3, 4, and a housing 6 which holds the electrodes 3, 4.

As the figures show, the electrodes 3, 4 are located next to one another with their longitudinal axes parallel to one another. In the illustrated embodiment, the electrodes 3, 4 are cylindrical with a circular cross section (FIG. 3A). However, other shapes may be used. For example, the electrodes can an oval and/or a rectangular cross section (FIGS. 3B & 3C). Furthermore, as shown at each end of the electrodes, they can be rounded or beveled in the area of their edges.

Figure 3:
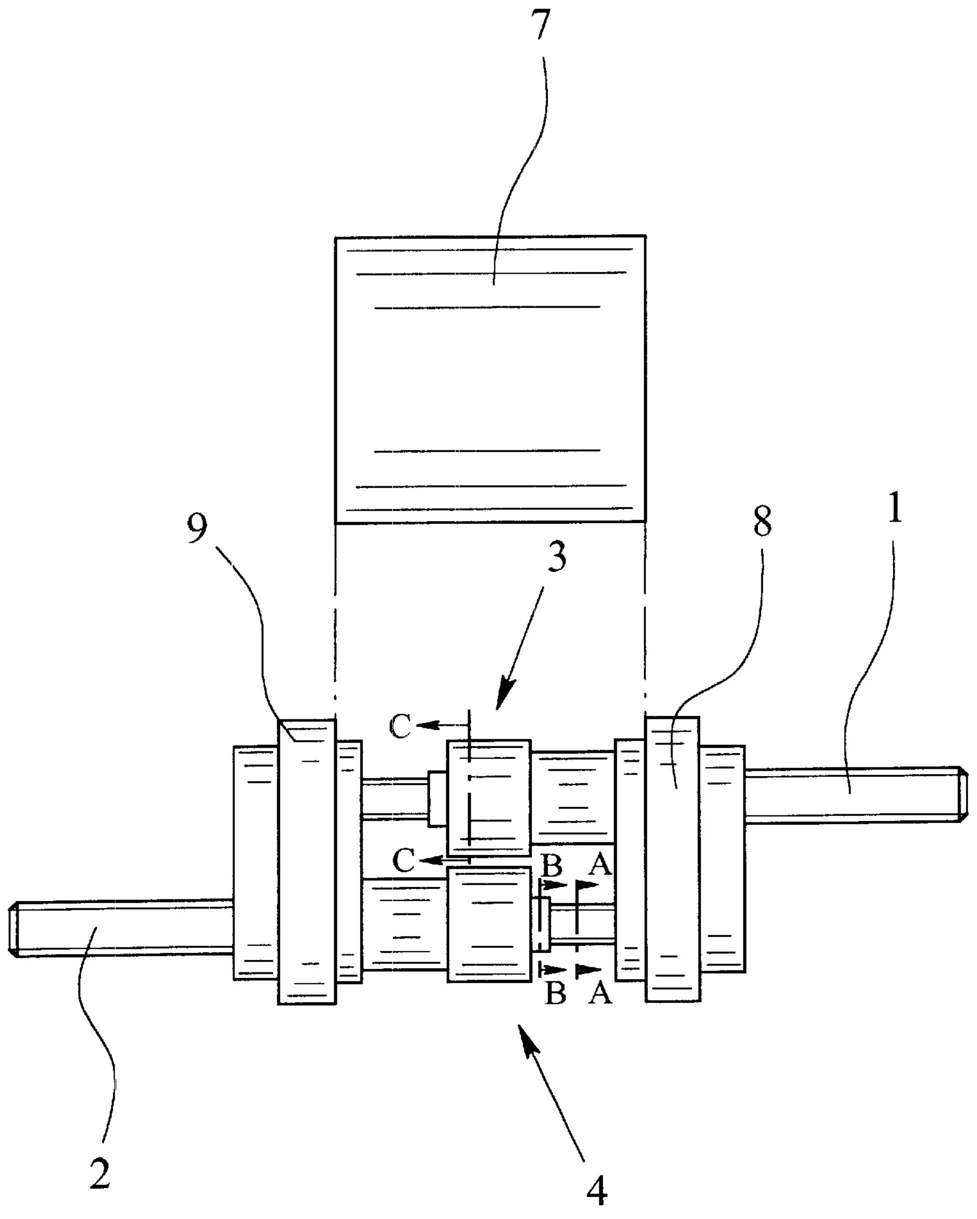
FIG. 3 shows the overvoltage protection element of FIGS. 1 and 2 with the housing opened.
Figure 3B:
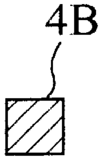
FIGS. 3A–3C are cross-sectional views taken along lines A—A, B—B and C—C in FIG. 3.
Figure 3C:
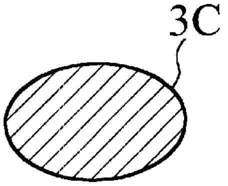
Figure 3A:
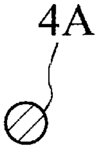

As FIGS. 1 & 3 show, the electrodes 3, 4 have different cross sections along their length. The electrodes 3, 4, therefore, have electrode sections 3*a*, 3*b*, 3*c*, 3*d*, and 3*e* and 4*a*, 4*b*, 4*c*, 4*d*, and 4*e*. The electrode sections 3*c* and 4*c* have the largest diameter. Between the electrodes 3*c* and 4*c* there is, therefore, the smallest distance so that the air-breakdown spark gap 5 is formed between the electrode sections 3*c* and 4*c*.

Figure 2:
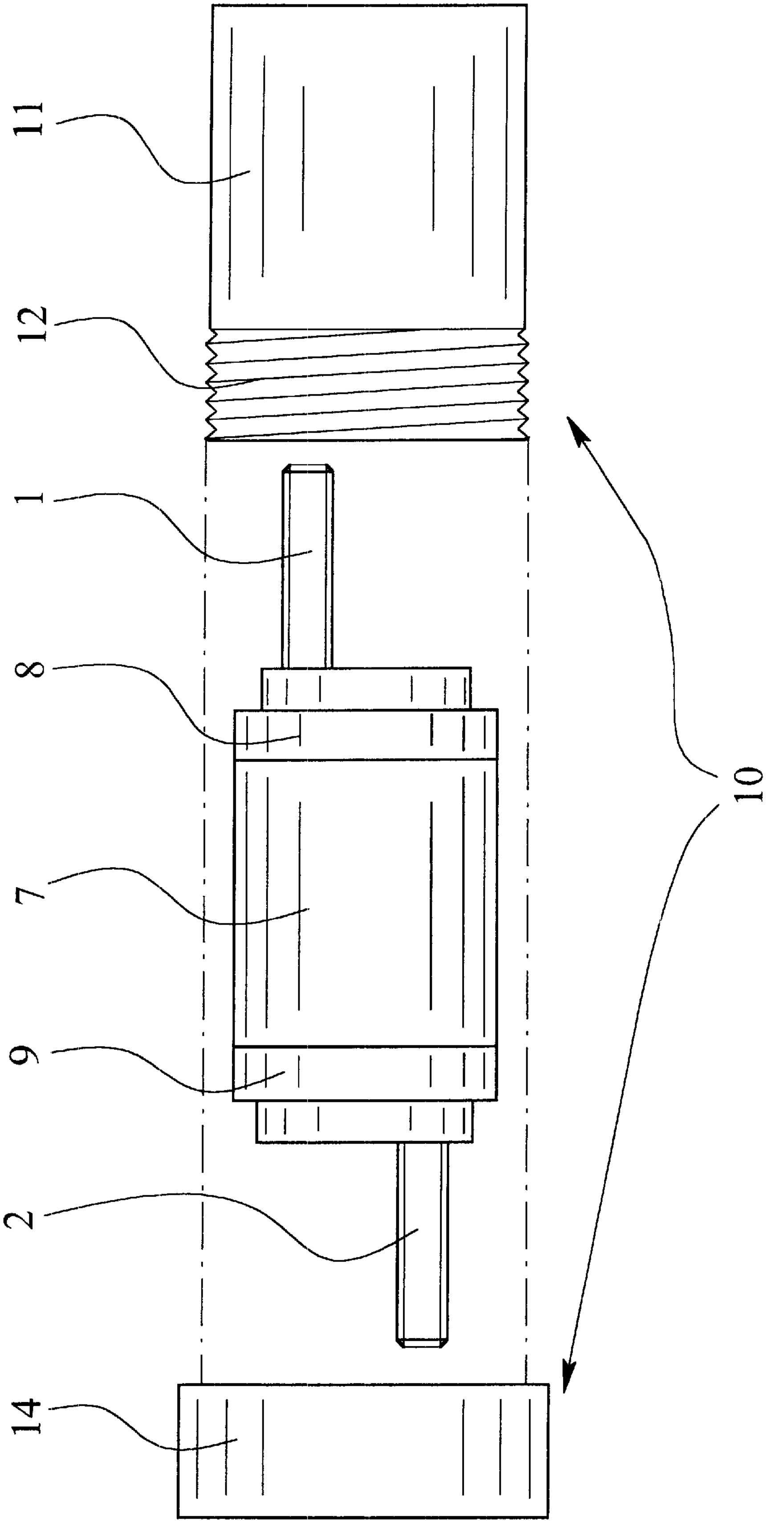
FIG. 2 is an exploded view of the overvoltage protection of FIG. 1.
Figure 4:
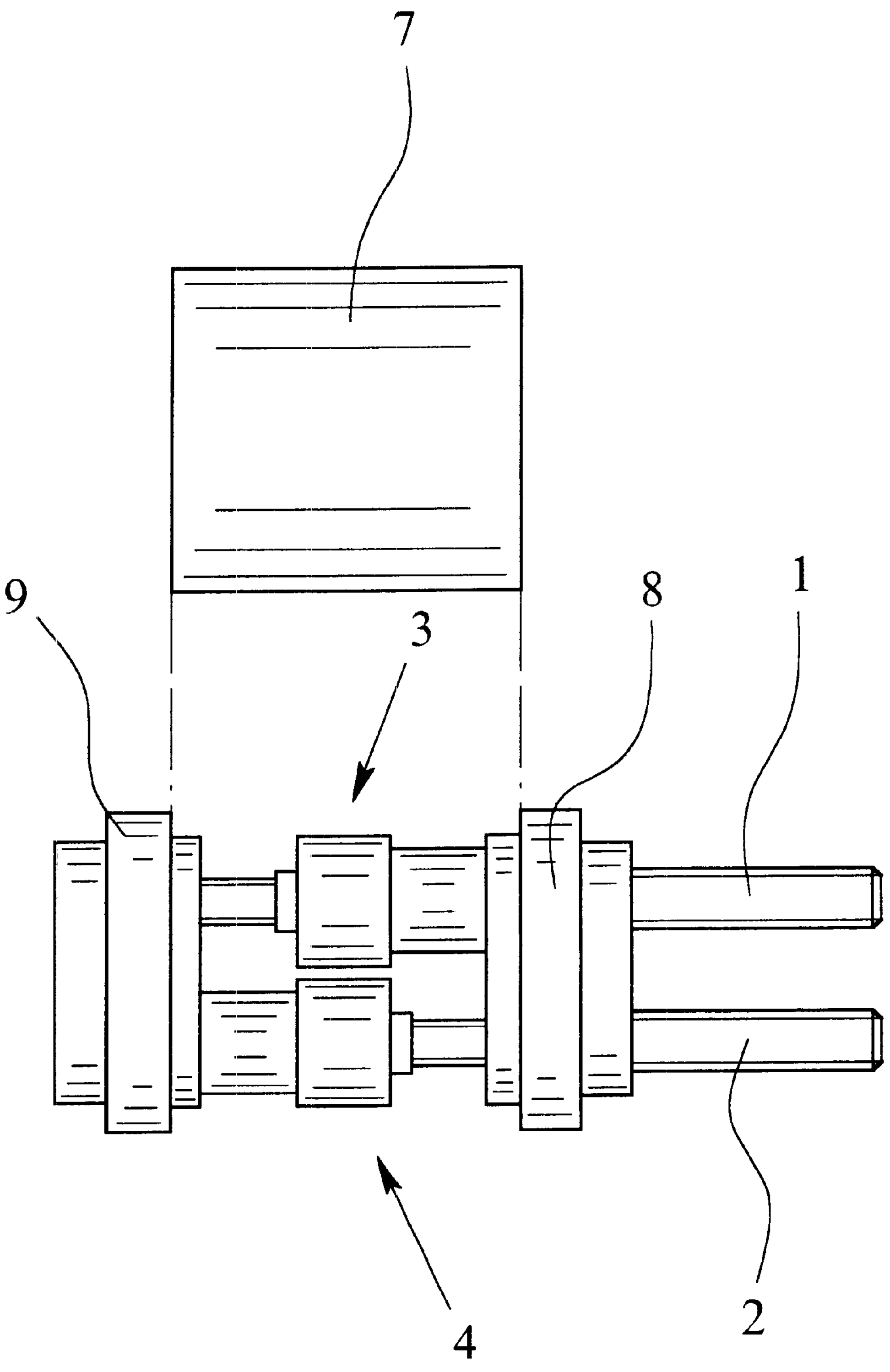
FIG. 4 is a view corresponding to FIG. 3, but of a modified embodiment.

In this embodiment, the current terminals 1 and 2 of two electrodes 3 and 4 lie on opposite sides. As can be easily seen from the FIGS. 1–3, the terminals 1 and 2 run parallel to one another. However, embodiments are also possible in which the current terminals of the two electrodes run towards one another at an acute angle. Likewise, an overvoltage protection element according to the invention can be provided where the current terminals of the two electrodes lie on the same side as shown in FIG. 4.

For the serviceability of the overvoltage protection element in accordance with the invention, it is especially advantageous when, as the figures do not show, the interior of the housing 6 which holds the electrodes 3, 4 is lined, the lining being formed preferably of POM Teflon®, i.e., polytetrafluoroethylene.

The embodiment of an overvoltage protection element in accordance with the invention which is shown in the figures is an especially advantageous one, in that the housing 6 which holds the electrodes 3, 4 is closed and pressure resistant. In particular, the housing 6 which holds the electrodes 3, 4 is made of a cylindrical housing jacket 7 and two housing flanges 8, 9, one of which is provided on each end of the housing jacket 7.

In this embodiment, in the above described structure of the housing 6 which holds the electrodes 3, 4, the compressive strength of the housing 6 is achieved in conjunction with an outer pressure cylinder 10. In particular, the pressure cylinder 10 has a pressure sleeve 11, the pressure sleeve 11 being provided, on one side, with an outer thread 12, and on the other end, with a flange 13 which projects inwardly, a union nut 14 being screwed onto the pressure sleeve 11.

The production of the overvoltage protection element according to the invention, i.e. the production of individual parts and the assembly of these individual parts, is exceptionally simple and thus economical. The current terminals 1, 2, the electrodes 3, 4, the individual parts of the housing 6, specifically the housing jacket 7 and the housing flanges 8, 9, and the individual parts of the outer pressure cylinder 10, i.e., the pressure sleeve 11 and the union nut 14, are rotationally symmetrical parts which are either easily available or can be series produced as rotary parts on modem machine tools.

As especially FIG. 1 shows, each housing flange 8, 9 is provided both with a through hole 15, 16 and also with a blind hole 17, 18. The housing flanges 8, 9 made in this way, therefore, allow both passage of the current terminals 1, 2, and also on the respective other side, end-side bearing of the electrodes 3, 4, specifically in the area of the electrode sections 3*e*, 4*e*.

It applies to the described, especially advantageous embodiment of an overvoltage protection element of the invention that the housing flange 8, 9 can be braced to seal against the cylindrical housing jacket 7, using the outer pressure cylinder 10, specifically by the fact that the union nut 14 is screwed onto the pressure sleeve 11.

In the overvoltage protection element according to the invention, the housing 6 which holds the electrodes 3, 4 uses air as the extinguishing gas; but, it can also be provided with another known extinguishing gas, for example, $SF_6$. The extinguishing gas can be under atmospheric pressure in the housing 6 which holds the electrodes 3, 4, but it is also possible, in the described embodiment, in which the housing 6 which holds the electrodes 3, 4 is made pressure resistant and pressure proof, that the extinguishing gas is under a pressure which differs from atmospheric pressure.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Overvoltage protection element for diverting transient overvoltage comprising:

two electrodes, each of which has a current terminal, an air-breakdown spark gap between the electrodes and a housing which holds the electrodes;

wherein the housing has a cylindrical housing jacket and a housing flange on each end of the housing jacket, the housing being closed, pressure resistant and pressure tight, and wherein an outer pressure cylinder encloses the housing, wherein the pressure cylinder has a pressure sleeve, the pressure sleeve being provided with an outer thread on one end and with a flange which projects inwardly at another end, and wherein a union nut is screwed onto the pressure sleeve.

2. Overvoltage protection element as claimed in claim 1, wherein the current terminals of the two electrodes lie on opposite ends of the housing.

3. Overvoltage protection element as claimed in claim 1, wherein the interior of the housing which holds the electrodes is lined.

4. Overvoltage protection element as claimed in claim 1, wherein the lining is made of polytetrafluoroethylene.

5. Overvoltage protection element as claimed in claim 1, wherein the housing which holds the electrodes contains air as an extinguishing gas.

6. Overvoltage protection element as claimed in claim 5, wherein the housing which holds the electrodes contains SF6 as an extinguishing gas.

7. Overvoltage protection element as claimed in claim 5, wherein the contains an extinguishing gas under atmospheric pressure.

8. Overvoltage protection element as claimed in claim 5, wherein the housing contains an extinguishing gas under a pressure which differs from atmospheric pressure.

* * * * *